Jan. 18, 1966  B. GOUDSWAARD ET AL  3,229,512
DEVICE FOR MEASURING MECHANICAL STRESSES
Filed Aug. 6, 1963

INVENTORS
BOUDEWIJN GOUDSWAARD
PIETER HUIJER
BY
AGENT

United States Patent Office
3,229,512
Patented Jan. 18, 1966

1

3,229,512
DEVICE FOR MEASURING MECHANICAL
STRESSES
Boudewijn Goudswaard and Pieter Huijer, Emmasingel, Eindhoven, Netherlands, assignors to North American Philips Company, Inc., New York, N.Y., a corporation of Delaware
Filed Aug. 6, 1963, Ser. No. 300,373
Claims priority, application Netherlands, Aug. 24, 1962, 282,500
10 Claims. (Cl. 73—88.5)

The invention relates to a device for measuring, recording or indicating in some other manner mechanical stresses, forces or displacements. The novel device comprises a resistance element which, under the influence of the stress, force, or displacement to be measured, is subjected to a change in shape and hence to a change in resistance. This change in resistance is measured and serves as an indication of the quantity to be measured.

Such known elements, the so-called strain gauges, substantially consist of resistance wires and are secured to a stressed structure in a manner such that the change in shape of this structure causes the strain gauges to be extended or compressed so that their resistance is changed. This change in resistance can be measured in known manner, for example, by connecting the element in a Wheatstone bridge. Generally the four arms of the bridge each include an element, two of the elements connected in opposite arms being subjected to tensile stress while the two elements connected in the other pair of opposite arms are subjected to compressive stress. Generally the changes in resistance are small so that comparatively expensive electrical equipment is required to measure the changes with the required degree of accuracy.

It is known that thin films consisting of magnetic material, for example, an alloy of 80% nickel and 20% iron, deposited from the vapour phase on an insulating base have a preferred magnetic direction, particularly when the deposition from vapour is effected in a magnetic field. Such films are used in computers as magnetic memory elements. In such elements the electric resistance in the preferred magnetic direction differs from that at right angles thereto. Magnetostriction is another known phenomenon in which magnetization of a rod of certain magnetic material produces a change in length, while conversely a strain or pressure produces a change in magnetization.

The present invention is based on the recognition of the fact that, when a thin film of the above described kind is subjected to a strain or a pressure in certain directions relative to the preferred direction of magnetization in the plane of the film, this preferred direction changes and this change involves a comparatively large change in resistance. The change in resistance is a maximum when the direction of the strain or pressure is at an angle of about 45° to the preferred direction. It has been found that in this case a certain relative change in the dimensions in the direction of the strain or pressure may produce a relative change in resistance which is large compared with the relative change in resistance of the known strain gauges with the same relative change in length of the resistance wire.

The invention consists in that in a device of the kind described in the preamble, the elements consist of a film of magnetic material which is deposited on an insulating base and has a pronounced preferred direction of magnetization which is at an angle of less than 90° to the direction of the greatest strain or pressure in the material.

2

The change in resistance can be determined in known manner by current and voltage measurements, in which preferably the direction of current flow substantially corresponds to the direction of the greatest strain or pressure or is substantially at right angles thereto.

When a bridge is used for the measurement, all the arms of the bridge preferably consist of said magnetic thin film elements which are jointly deposited on an insulating base, for example, a glass plate. The thin film elements are deposited in the form of strips so arranged directionally that the axes of one pair of strips extend substantially at right angles to the axes of the other pair of strips.

A particularly suitable material for the magnetic thin film is a nickel cobalt alloy.

It has been found that if the preferred magnetic direction is not excessively rotated in response to the applied stress, for example over an angle of 20° at the most, a linear relationship is obtainable between the mechanical stress and the indication.

The invention will now be more fully described with reference to the accompanying drawing in which.

Figure 1:
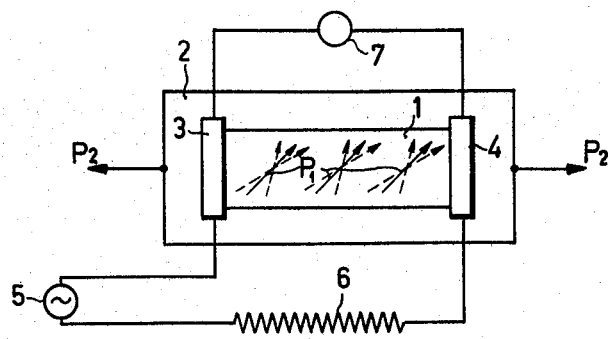
FIG. 1 is a diagrammatic illustration of one embodiment of the invention.

FIGURE 1 of the drawing shows the circuit arrangement of an element which may be used in a device in accordance with the invention.

A magnetic thin film element 1 of elongated shape, which may have a thickness of about $0.1\mu$, is deposited from the vapour phase on a glass plate 2 having a thickness of, for example, from 0.1–1 mm. in accordance with the desired sensitivity. The whole assembly may be subjected to bending stress by a weight to be determined. In the drawing it is assumed for the sake of simplicity that there is a tensile force $P_2$. The preferred direction of magnetization of magnetic thin film element which is indicated by an arrow $P_1$, is at an angle of about 45° to this force.

The element 1 is provided with two current supply terminals 3 and 4, preferably in the form of strips, which are connected through a resistance 6 to a voltage source 5 which causes a substantially constant current to flow through the element. The voltage at the terminals 3 and 4 is measured by means of a voltmeter 7.

When the element is subjected to a force $P_2$, the preferred magnetic direction will perform a rotation in the positive or negative sense depending upon the sense of the force, the extreme values of the rotation being shown in the drawing by broken lines. As a result the voltage across the terminals 3 and 4 is changed and this change is a measure of the value of the force $P_2$.

Figure 2:
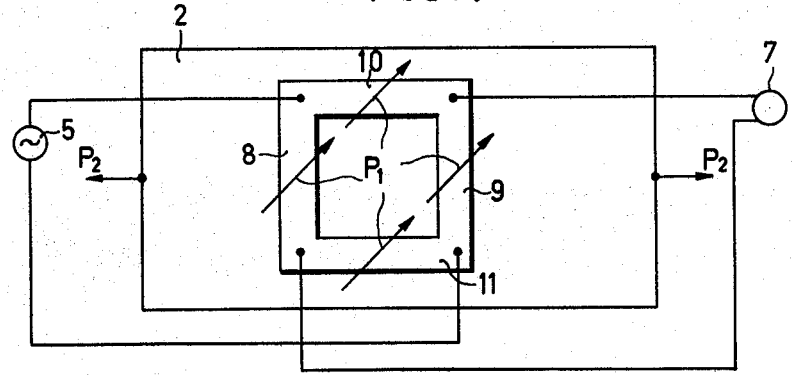
FIG. 2 illustrates a second embodiment of the invention utilizing a bridge circuit arrangement.

FIGURE 2 shows a device in accordance with the invention in the form of a bridge arrangement. The bridge comprises four magnetic thin film elements 8, 9, 10 and 11, of which the first two extend at right angles to the direction of the force to be measured while the other two extend parallel thereto. As in FIG. 1, the arrows $P_1$ indicate the preferred direction of magnetization of elements 8, 9, 10 and 11. Under the influence of the force $P_2$ the resistance values of the elements 8 and 9 will be changed in a sense opposite to that in which the resistance values of the elements 10 and 11 are changed. Thus the sensitivity is increased and at the same time the influence of temperature variations is eliminated, because they cause variations of the resistances of the four film elements which have the same sense and consequently compensate each other. The width of the elements may be of the order of 0.5 mm. and their length of the order of from 2–4 mm. They are jointly deposited from the vapour phase, and in this process the preferred direction of magnetization is determined by the magnetic field used.

Figure 4:
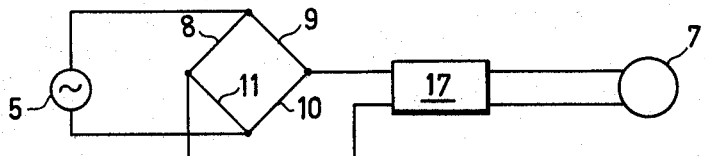
FIG. 4 illustrates the bridge circuit of FIG. 2 in simplified form.

FIG. 4 shows the bridge circuit in a simplified form together with the alternating voltage source 5, an amplifier 17 for the output voltage and the indicating instrument 7.

Figure 3:
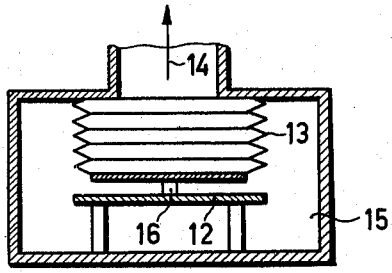
FIG. 3 illustrates a device for measuring gas pressure embodying the principles of the invention.

FIGURE 3 shows a pressure measuring device in accordance with the invention. A bridge circuit of the kind shown in FIGURE 2 may be deposited from the vapor phase on a diaphragm 12. A chamber 15 enclosing the diaphragm may be evacuated so that the elements are not exposed to atmospheric influences. The chamber 15 is separated by a bellows 13 from a chamber 14 in which the gas pressure is to be measured. The diaphragm is connected to the bellows by a member 16. The current supply wires may be brought out in an insulating and gas-tight manner by known means.

The device may also be used for measuring movements of machine parts, as a roughness meter, in measuring vibrations of revolving components, in measuring accelerations, and so on.

What is claimed is:

1. Apparatus for determining the strain in a body comprising an insulating base adapted to be connected to said body thereby to have a stress producing force applied thereto, a thin film of magnetic material on said insulating base and having a preferred direction of magnetization, said preferred direction of magnetization forming an angle of less than ninety degrees with respect to the direction of the greatest tensile or compressive stress produced in said film, said magnetic film upon deformation undergoing a change in its resistance proportional to said deformation, a constant current source, means connecting said current source to said thin film thereby to establish a substantially constant current flow therein, and means coupled to said magnetic film for sensing said resistance variations and producing an electrical indication thereof.

2. A strain gauge comprising an insulating support member adapted to have a stress producing force applied thereto, a thin film of magnetic material supported thereon, said film of magnetic material exhibiting a preferred direction of magnetization which defines an angle of less than ninety degrees with respect to the direction of stress produced in said material, said magnetic film undergoing a deformation in response to said stress producing force which produces a proportional change in electrical resistance thereof, means for supplying an electric current to said magnetic film, and means connected to said magnetic film for sensing said resistance variations and producing an electrical indication thereof.

3. Apparatus for determining the strain in a body comprising an insulating base adapted to be connected to said body thereby to have a stress producing force applied thereto, a thin film of magnetic material supported on said insulating base and having a preferred direction of magnetization, said preferred direction of magnetization forming an angle of less than ninety degrees with respect to the direction of the greatest tensile or compressive stress produced in said film, said magnetic film undergoing a deformation in response to said stress producing force which produces a change in resistance thereof which is proportional to said deformation, means for supplying an electric current to said magnetic film to establish a current flow therein in a direction that substantially coincides with the direction of greatest tensile or compressive stress produced in said film, and electro-responsive means coupled to said magnetic film for determining the resistance thereof.

4. Apparatus for determining the strain in a body comprising an insulating base adapted to be connected to said body thereby to have a stress producing force applied thereto, a thin film of magnetic material supported on said insulating base and having a preferred direction of magnetization, said preferred direction of magnetization forming an angle of less than ninety degrees with respect to the direction of the greatest tensile or compressive stress produced in said film, said magnetic film undergoing a deformation in response to said stress producing force which produces a change in resistance thereof which is proportional to said deformation, means for supplying an electric current to said magnetic film to establish a current flow therein in a direction that is substantial orthogonal to the direction of greatest tensile or compressive stress produced in said film, and electro-responsive means coupled to said magnetic film for determining the resistance thereof.

5. An electrical strain gauge comprising an insulating support member, a thin film deposit of magnetic material on said support member, means for transmitting a force to be measured to said support member in a direction to subject said magnetic film to a tensile or compressive stress, said film of magnetic material exhibiting a preferred direction of magnetization which defines an angle of forty-five degrees with respect to the direction of stress produced in said material, said magnetic film undergoing a deformation in response to said stress producing force which produces a change in resistance thereof which is proportional to said force, means for supplying an electric current to said magnetic film, and electro-responsive means coupled to said magnetic film for sensing said resistance variations and producing an electrical indication thereof.

6. An electrical strain gauge comprising an insulating support member adapted to have a stress-producing force applied thereto, a thin film of magnetic material deposited on said support member and subject to a tensile or compressive stress in the plane of the film produced therein by said force, said magnetic film exhibiting a preferred direction of magnetization which defines an acute angle with the direction of said stress produced in said magnetic film, said magnetic film undergoing a deformation in response to said stress producing force which produces a change in electrical resistance of said film which is proportional thereto, means for supplying an electric current to said magnetic film, and a volt-meter connected across said magnetic film for sensing said resistance variations and producing an indication thereof.

7. An electrical strain gauge comprising an insulating support member adapted to have a stress producing force applied thereto, first, second, third and fourth thin films of magnetic material deposited on said support member, said first and second films extending at right angles to the direction of said force and said third and fourth films extending parallel to the direction of said force, means connecting said thin films in a bridge circuit arrangement having input and output terminals, each of said magnetic films exhibiting a preferred direction of magnetization which forms an angle of less than ninety degrees with respect to the direction of stress produced therein, each of said magnetic films undergoing a deformation in response to said stress producing force which produces a proportional change in electrical resistance thereof, means for supplying an electric current to said input terminals, and means connected to said output terminals for sensing said resistance variations and producing an electrical indication thereof.

8. Apparatus as described in claim 7 wherein said magnetic thin films comprise elongated strip-like elements which are arranged on said support member so that the axes of one pair of elements extend substantially at right angles to the axes of the other pair of elements.

9. Apparatus as described in claim 8 wherein said one pair of elements form one set of opposite arms of said bridge circuit and said other pair of elements form a second set of opposite arms of said bridge circuit, said elements being arranged so that the preferred direction of magnetization of said elements are substantially in parallel alignment.

10. Apparatus as described in claim 8 wherein said magnetic film consists of an alloy of nickel and cobalt.

References Cited by the Examiner
UNITED STATES PATENTS

| | | | |
|---|---|---|---|
| 2,002,696 | 5/1935 | Kelsall | 148—108 |
| 2,621,276 | 12/1952 | Howland | 73—88.5 |
| 2,836,492 | 5/1958 | Clark | 75—170 |
| 3,039,891 | 6/1962 | Mitchell | 148—108 |

RICHARD C. QUIESSER, *Primary Examiner.*